(12) United States Patent
Schwager et al.

(10) Patent No.: US 10,394,281 B2
(45) Date of Patent: Aug. 27, 2019

(54) DISPLAY COVER PANEL WITH INSERT MOLDING

(71) Applicant: Dell Products L.P., Round Rock, TX (US)

(72) Inventors: Mark Andrew Schwager, Cedar Park, TX (US); Deeder M. Aurongzeb, Austin, TX (US); Chi-Chou Cheng, Taoyuan County (TW); Kai-Yuan Cheng, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/238,334

(22) Filed: Jan. 2, 2019

(65) Prior Publication Data

US 2019/0138055 A1    May 9, 2019

Related U.S. Application Data

(60) Division of application No. 15/199,235, filed on Jun. 30, 2016, now Pat. No. 10,185,361, which is a continuation-in-part of application No. 14/747,393, filed on Jun. 23, 2015, now Pat. No. 10,031,552.

(51) Int. Cl.
*G06F 1/16* (2006.01)

(52) U.S. Cl.
CPC ......... *G06F 1/1637* (2013.01); *G06F 1/1626* (2013.01); *G06F 1/1656* (2013.01)

(58) Field of Classification Search
CPC .... G06F 1/1626; G06F 1/1656; G06F 1/1681; G06F 1/133308
See application file for complete search history.

(56) References Cited

U.S. PATENT DOCUMENTS

| | | | |
|---|---|---|---|
| 4,252,248 A | 2/1981 | Obrist | |
| 5,613,237 A | 3/1997 | Bent | |
| 6,574,096 B1 * | 6/2003 | Difonzo | G06F 1/1616 345/169 |
| 6,894,739 B2 | 5/2005 | Sung | |
| 6,927,335 B2 | 8/2005 | Lim | |
| 7,209,195 B2 | 4/2007 | Lin | |
| 7,626,807 B2 | 12/2009 | Hsu | |
| 7,712,621 B2 | 5/2010 | Cho | |
| 7,940,287 B2 | 5/2011 | Kim | |
| 8,254,098 B2 | 8/2012 | Liu | |
| 8,315,043 B2 | 11/2012 | Lynch | |
| 8,437,120 B2 | 5/2013 | Lee | |
| 8,448,814 B2 | 5/2013 | Yamamoto | |
| 8,561,831 B2 | 10/2013 | Liao | |
| 9,215,817 B1 | 12/2015 | Cohen | |
| 10,031,552 B2 * | 7/2018 | Schwager | G06F 1/1637 |
| 10,185,361 B2 * | 1/2019 | Schwager | G06F 1/1637 |

(Continued)

*Primary Examiner* — Adrian S Wilson
(74) *Attorney, Agent, or Firm* — Baker Botts L.L.P.

(57) ABSTRACT

A display in a portable information handling system may have a narrow or no border. A display panel cover included with the display may be formed with an insert molding that is co-molded with an outer panel for high bonding strength and high stiffness, as well as providing a desired high quality external appearance to information handling system. Additionally, an exterior insert molding may be formed to include an exterior surface of the information handling system.

6 Claims, 8 Drawing Sheets

(56) References Cited

U.S. PATENT DOCUMENTS

| | | |
|---|---|---|
| 2005/0023022 A1* | 2/2005 | Kriege .................. G06F 1/1616 |
| | | 174/559 |
| 2005/0237443 A1 | 10/2005 | Nakanishi |
| 2009/0017242 A1 | 1/2009 | Weber |
| 2009/0175020 A1 | 7/2009 | Zadesky |
| 2010/0061044 A1 | 3/2010 | Zou |
| 2011/0049139 A1 | 3/2011 | Jiang |
| 2011/0250377 A1* | 10/2011 | Qin .................. B29C 45/14311 |
| | | 428/99 |
| 2012/0106035 A1 | 5/2012 | Chen |
| 2013/0027862 A1 | 1/2013 | Rayner |
| 2013/0107434 A1 | 5/2013 | Lynch |
| 2013/0286627 A1 | 10/2013 | Lee |
| 2015/0043141 A1 | 2/2015 | Pegg |
| 2015/0062845 A1 | 3/2015 | Akashi |
| 2016/0378139 A1 | 12/2016 | Schwager et al. |

\* cited by examiner

DISPLAY COVER PANEL WITH INSERT MOLDING

CROSS-REFERENCE TO RELATED APPLICATION

The present application is a divisional application of U.S. patent application Ser. No. 15/199,235 filed Jun. 30, 2016; which is a continuation-in-part of U.S. patent application Ser. No. 14/747,393 filed Jun. 23, 2015, now U.S. Pat. No. 10,031,552 granted Jul. 24, 2018, the contents of which are hereby incorporated by reference in their entirety for all purposes.

FIELD OF THE DISCLOSURE

This disclosure relates generally to information handling systems and, more particularly, to a display cover panel with insert molding.

DESCRIPTION OF THE RELATED ART

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include portable devices such as notebook computers, media players, personal data assistants, digital cameras, cellular phones, cordless phones, smart phones, tablet computers, and 2-in-1 tablet-laptop combination computers. A portable device may generally be any device that a user may carry for handheld use and that includes a processor. Typically, portable devices are powered using a rechargeable battery. New designs for the displays included with portable information handling systems include ultra-thin implementations with narrow or no border.

SUMMARY

In one aspect, a display cover panel is for portable information handling systems. The display cover panel may include an outer panel forming an exterior of a display included in a portable information handling system. In the display cover panel, the outer panel may include a molding tab that extends in a first direction towards a display surface of the display. In the display cover panel, the molding tab may be located next to an external edge of the outer panel. In the display cover panel, the molding tab has a height H and a width B. The display cover panel may also include an insert molding bonded with the outer panel at the molding tab. In the display cover panel, the molding tab may be covered by the insert molding over the height H and the width B. In the display cover panel, the insert molding may include a polymer that is bonded with the outer panel by co-molding with the outer panel. In the display cover panel, a maximum thickness T of the insert molding when bonded to the molding tab may be less than 2 mm and a first dimensionless ratio of H to B may be at least 1.8. In the display cover panel, the display may have a minimum diagonal size of 12 inches.

In any of the disclosed embodiments of the display cover panel, a first bonding strength of the insert molding bonded with the outer panel at the molding tab may be sufficient to withstand at least 45 Newtons force applied in a second direction perpendicular to the first direction at the external edge. In any of the disclosed embodiments of the display cover panel, the insert molding may have a first portion covering the molding tab at the external edge having a thickness A. In any of the disclosed embodiments of the display cover panel, the insert molding may have a second portion covering the molding tab at an internal edge of the outer panel having a thickness C. In any of the disclosed embodiments of the display cover panel, the insert molding may have a minimum thickness given by (A+B+C). In any of the disclosed embodiments of the display cover panel, a second dimensionless ratio of H to (A+B+C) may be at least 0.8.

In any of the disclosed embodiments of the display cover panel, a third dimensionless ratio of H to T may beat least 0.6. In the display cover panel, the insert molding may increase a stiffness of the display cover panel.

In any of the disclosed embodiments of the display cover panel, the height H may be less than 1.50 mm and the thickness B may be less than 0.75 mm. In the display cover panel, the insert molding may form an outer surface of the portable information handling system.

In any of the disclosed embodiments of the display cover panel, the outer panel may be formed of a metal and the insert molding may include a carbon-fiber-filled poly (butylene terephthalate) resin. In the display cover panel, the insert molding may be formed at more than one external edge of the outer panel.

In any of the disclosed embodiments of the display cover panel, the molding tab may include a hinge molding tab that is formed in the first direction along the external edge that is proximate to a display hinge of the portable information handling system. In the display panel cover, the insert molding may include a hinge insert molding bonded with the outer panel at the hinge molding tab.

In any of the disclosed embodiments of the display cover panel, the outer panel may include an exterior molding portion extending in a third direction opposite the first direction and opposing the hinge molding tab. In any of the disclosed embodiments, the display cover panel may further include an exterior insert molding bonded with the outer panel at the exterior molding portion. In the display cover panel, the exterior insert molding may include the external surface.

In any of the disclosed embodiments of the display cover panel, the molding tab may include at least one cutout portion having a reduced height H' that is less than H. In the display cover panel, a cutout portion may form a tab in the insert molding corresponding to the cutout portion during co-molding.

In any of the disclosed embodiments of the display cover panel, the cutout portion may include an overhang that increases a second bonding strength of the insert molding to the outer panel in the first direction.

Other disclosed aspects include an information handling system comprising the display cover panel.

In another aspect, a disclosed method is for forming a display cover panel for portable information handling systems. The method may include forming an outer panel that is an exterior of a display included in a portable information handling system. In the method, the outer panel may include a molding tab that extends in a first direction towards a display surface of the display. In the method, the molding tab may be located next to an external edge of the outer panel. In the method, the molding tab may have a height H and a width B. The method may include co-molding an insert molding to the outer panel at the molding tab. In the method, the molding tab may be covered by the insert molding over the height H and the width B. In the method, the insert molding may include a polymer that is bonded with the outer panel during the co-molding. In the method, the display may have a minimum diagonal size of 12 inches. In the method, a maximum thickness T of the insert molding when bonded to the molding tab may be less than 2 mm and a first dimensionless ratio of H to B may be at least 1.8. In the method, a first bonding strength of the insert molding bonded with the outer panel at the molding tab may be sufficient to withstand at least 45 Newtons force applied in a second direction perpendicular to the first direction at the external edge. In the method, the insert molding may have a first portion covering the molding tab at the external edge having a thickness A. In the method, the insert molding may have a second portion covering the molding tab at an internal edge of the outer panel having a thickness C. In the method, the insert molding may have a minimum thickness given by (A+B+C). In the method, a second dimensionless ratio of H to (A+B+C) may be at least 0.8.

In any of the disclosed embodiments of the method, the co-molding may include co-molding the insert molding with a thickness T' that is greater than T, while the method may include diamond cutting the outer panel and the insert molding to reduce the maximum thickness of the insert molding to T. In the method, the diamond cutting may form an exterior surface of the portable information handling system.

In any of the disclosed embodiments of the method, a third dimensionless ratio of H to T may be at least 0.6. In any of the disclosed embodiments of the method, the insert molding may increase a stiffness of the display cover panel. In any of the disclosed embodiments of the method, the height H may be less than 1.5 mm and the thickness B may be less than 0.75 mm. In any of the disclosed embodiments of the method, the insert molding may form an outer surface of the portable information handling system.

In any of the disclosed embodiments of the method, the outer panel may be formed of aluminum and the insert molding may include a carbon-fiber-filled poly (butylene terephthalate) resin. In the method, the insert molding may be formed at more than one external edge of the outer panel.

In any of the disclosed embodiments of the method, the molding tab may include a hinge molding tab that is formed in the first direction along the external edge that is proximate to a display hinge of the portable information handling system. In the method, the insert molding may include a hinge insert molding bonded with the outer panel at the hinge molding tab.

In any of the disclosed embodiments of the method, the outer panel may include an exterior molding portion extending in a third direction opposite the first direction and opposing the hinge molding tab. In any of the disclosed embodiments of the method, the display cover panel may further include an exterior insert molding bonded with the outer panel at the exterior molding portion. In the method, the exterior insert molding may include the exterior surface.

In any of the disclosed embodiments of the method, the molding tab may include at least one cutout portion having a reduced height H' that is less than H. In the method, a cutout portion may form a tab in the insert molding corresponding to the cutout portion during co-molding.

In any of the disclosed embodiments of the method, the cutout portion may include an overhang that increases a second bonding strength of the insert molding to the outer panel in the first direction.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and flash memory (SSD); as well as communications media such wires, optical fibers, microwaves, radio waves, and other electromagnetic or optical carriers; or any combination of the foregoing.

Particular embodiments are best understood by reference to FIGS. 1, 2, 3, 4, 5, 6 and 7 wherein like numbers are used to indicate like and corresponding parts.

Figure 1:
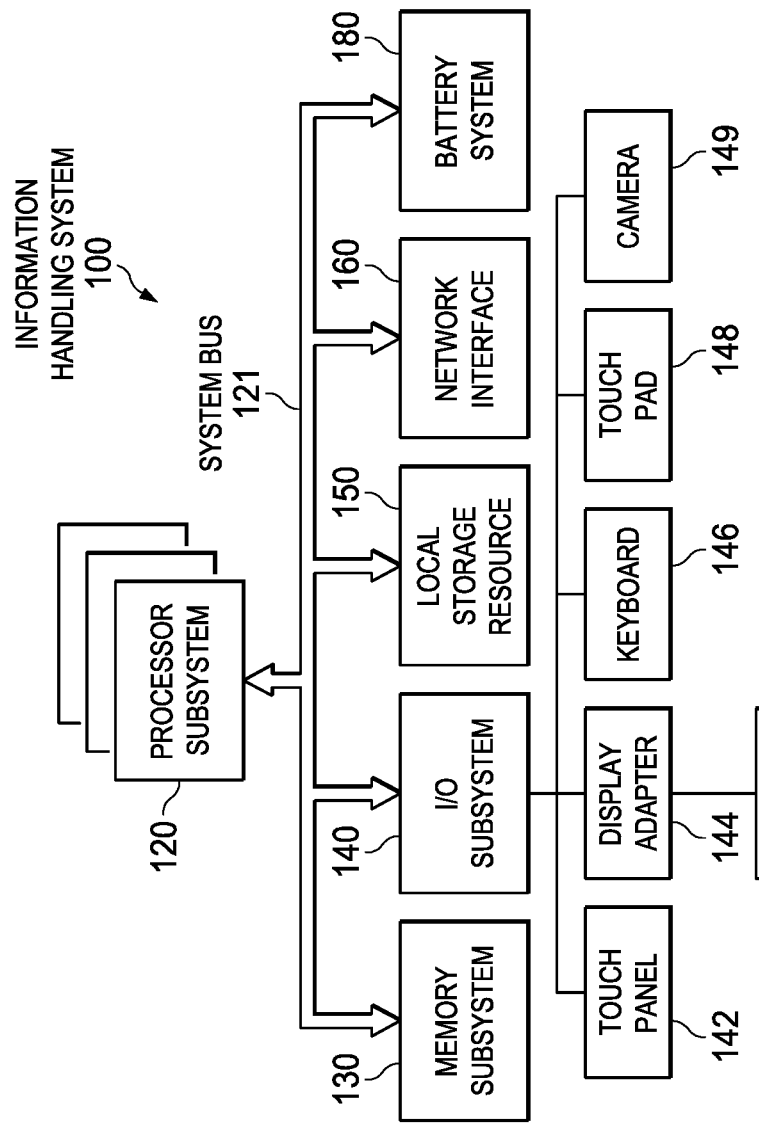
FIG. 1 is a block diagram of selected elements of an embodiment of an information handling system.

Turning now to the drawings, FIG. 1 illustrates a block diagram depicting selected elements of an embodiment of information handling system 100. In various embodiments, information handling system 100 may represent different types of portable devices.

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, a network interface 160, and battery system 180. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. Also shown is battery system 180, which may represent a rechargeable battery and related components included with information handling system 100.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

As depicted in FIG. 1, processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or another component of physical hardware 102). In the same or alternative embodiments, processor subsystem 120 may interpret and execute program instructions and process data stored remotely (e.g., in a network storage resource).

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage or a suitable selection or array of volatile or non-volatile memory that retains data after power is removed. Local storage resource 150 may comprise computer-readable media (e.g., hard disk drive, floppy disk drive, CD-ROM, and other type of rotating storage media, flash memory, EEPROM, or another type of solid state storage media) and may be generally operable to store instructions and data.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. As shown, I/O subsystem 140 may comprise touch panel 142, display adapter 144, keyboard 146, touch pad 148, and camera 149. Touch panel 142 may include circuitry for enabling touch functionality in conjunction with display 145 that is driven by display adapter 144. Camera 149 may represent any of a variety of imaging devices, such as a video camera, infrared camera, or combinations thereof.

In various embodiments of information handling system 100, such as portable devices or so-called all-in-one devices, display 145 may be mechanically integrated to other components. Furthermore, touch panel 142 may be integrated into display 145 such that a touch user interface is provided to a user. The touch user interface typically coincides with a pixel space of display 145 such that touch inputs correspond to certain display pixels, which may present user interface elements, such as buttons, menus, input fields, etc., to the user.

As display 145 and touch panel 142 become more lightweight and thinner, the display portion may extend nearly to the edge of display 145 and may be implemented with a very small or no border. Accordingly, the construction and assembly of display 145 may increasingly involve smaller and smaller components and part dimensions.

In various embodiments, display 145 may include a display panel cover (also referred to as an A-cover) that covers an opposite face of display 145 from a display surface viewed by a user. The display panel cover may serve as an external component of information handling system 100 and may accordingly serve an aesthetic and structural function. Aesthetically, it may be desirable that the display panel cover have an attractive appearance and be made using high quality materials that match expectations of modern users. Oftentimes the display panel cover will carry a logo or a mark of the manufacturer. Structurally, the display panel cover provides protection and packaging for display components, as well as enabling assembly of display 145. In addition, for modern display designs that are very thin and have little or no border, the display panel cover may provide an important contribution to an overall stiffness of display 145.

As will be described in further detail herein, a display panel cover included with display 145 may be formed with an insert molding that is co-molded with an outer panel for high bonding strength and high stiffness, as well as providing a desired high quality external appearance to information handling system 100. The joint between the insert molding and the outer panel may be formed using a molding tab that extends from the outer panel in the direction of the display surface. The molding tab may further include cutouts that result in a tab being formed in the insert molding and that improve the bonding strength.

Figure 2:
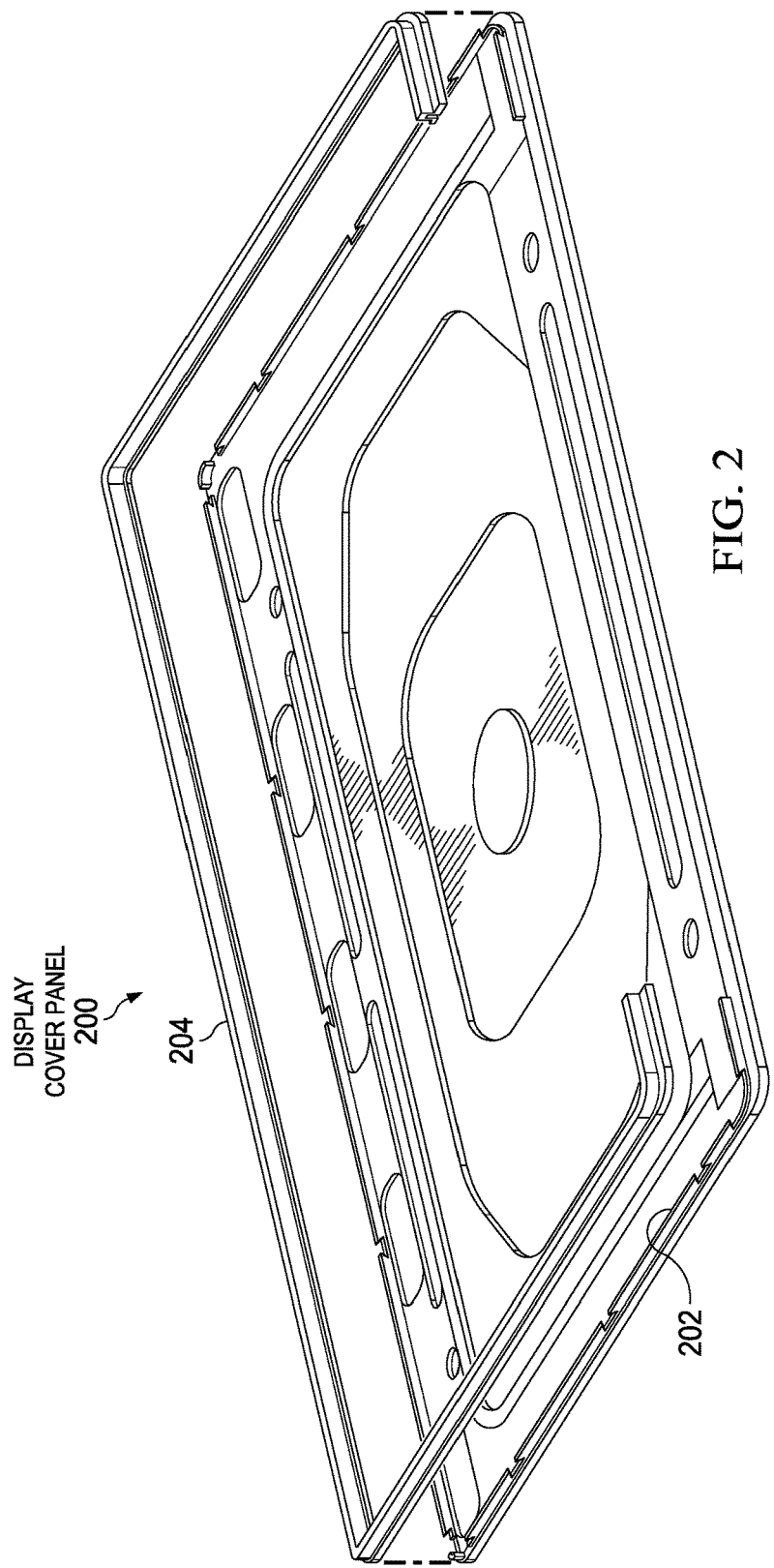
FIG. 2 is an illustration of selected elements of an embodiment of a display cover panel.

Referring now to FIG. 2, selected elements of an embodiment of a display panel cover 200 for a portable information handling system, such as information handling system 100 in FIG. 1, are illustrated. FIG. 2 is a schematic illustration and is not drawn to scale. In FIG. 2, display panel cover 200 is shown comprising outer panel 202 and insert molding 204, which is shown separated for clarity. In particular embodiments, display panel cover 200 may be used with displays having a diagonal size of 12 inches or greater. Insert molding 204 is shown encompassing an external edge of display panel cover 200 along three full edges and also partially along a fourth edge that corresponds to a display hinge. Thus, in final form, insert molding 204 may appear as a small strip that is flush with the external edge and that appears seamlessly bonded with outer panel 202. Outer panel 202 may be formed as a unitary piece using a metal, such as aluminum or magnesium or various alloys, while insert molding 204 may be formed using a polymer. In some embodiments, insert molding 204 may be formed with a polymer matrix phase that is filled with a reinforcing second phase material, such as carbon fiber, aramid fiber (such as Kevlar® DuPont™), or clay particles. In one example, insert molding 204 may comprise a poly (butylene terephthalate) resin that is filled with a carbon fiber, or a para-aramid synthetic fiber, such as Kevlar®. In another example, insert molding 204 may comprise a nanocomposite of polyamide 6 (PA6) resin with sodium-montmorillonite clay. In various embodiments, any suitable plastic material may be used to form insert molding 204.

Because of the small dimensions of the joint between insert molding 204 and outer panel 202, it has been observed that bonding of insert molding 204 to outer panel 202 as separate parts does not result in a sufficient bonding strength and bond reliability for use in display panel cover 200. Therefore, the inventors of the present disclosure have developed a method for co-molding insert molding 204 to outer panel 202 using molding tabs that are formed within outer panel 202 (see also FIG. 3). Thus, to manufacture display panel cover 200, outer panel 202 is formed and machined to form detail features, including the molding tabs. Then, a co-molding is performed to simultaneously create insert molding 204 and bond insert molding 204 to outer panel 202 at the molding tabs. Thus, despite the small dimensions of insert molding 204, in particular the bonded regions, display panel cover 200 may have exceptional strength of the bonding of insert molding 204, as well as improved overall stiffness due to the material used for insert molding 204.

Figure 3:
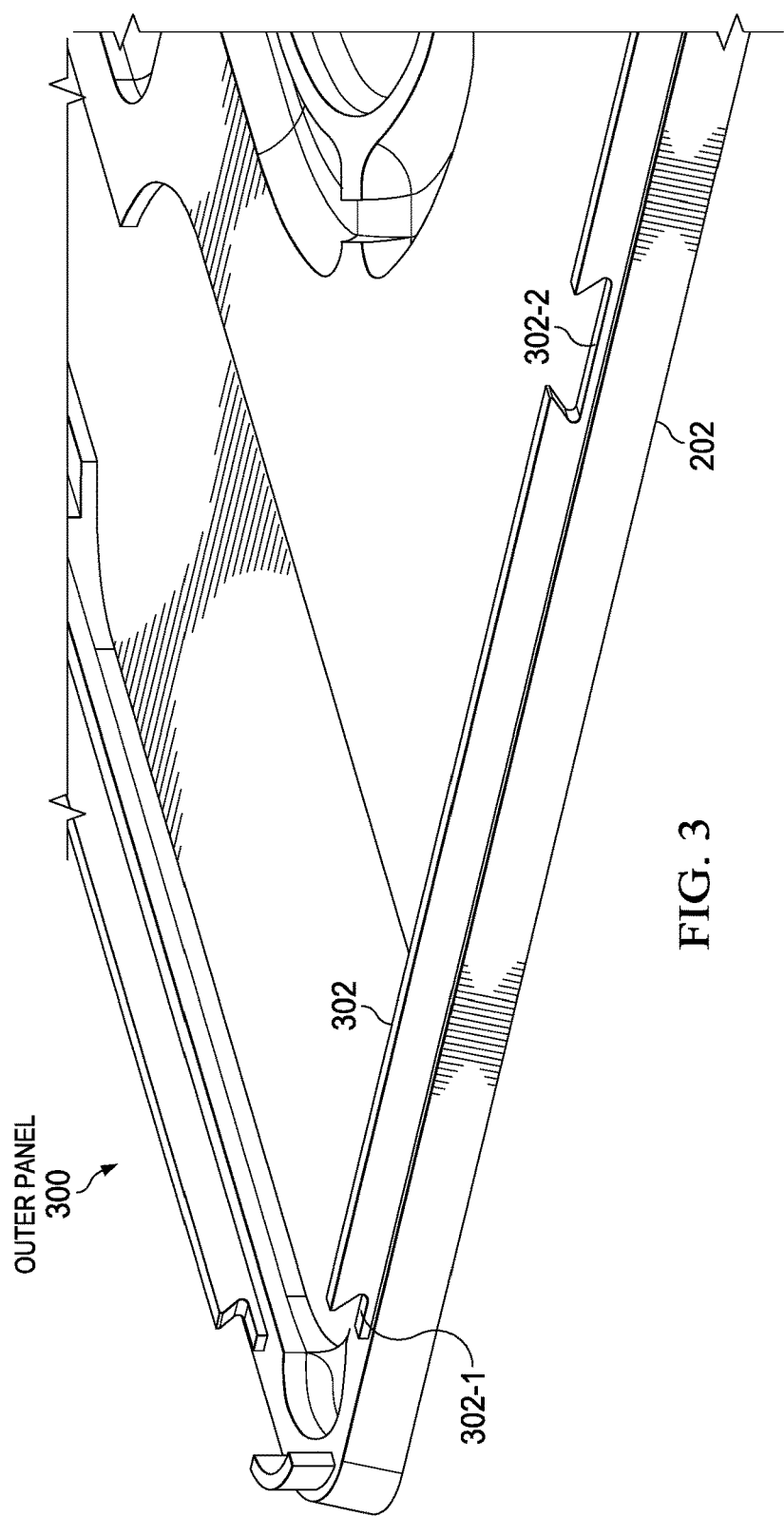
FIG. 3 is an illustration of selected elements of an embodiment of a display cover panel.

Referring now to FIG. 3, selected elements of an embodiment of an outer panel view 300 for a portable information handling system, such as information handling system 100 in FIG. 1, are illustrated. FIG. 3 is a schematic illustration and is not drawn to scale. In FIG. 3, outer panel view 300 is shown as a detail view of a corner of outer panel 202 shown in FIG. 2. In outer panel view 300, molding tab 302 is visible as a profile that extends outwards to receive insert molding 204 during co-molding, as described. Also visible in FIG. 3 are cutout portions 302-1 and 302-2 that have a reduced height from other portions of molding tab 302. Cutout portions 302-1 and 302-2 also are formed with an overhang such that upon co-molding of insert molding 204, a tab is formed in insert molding 204 in the precise shape of respective cutout portions 302-1 and 302-2. The tab in insert molding 204 become fixed against the overhangs of cutout portions 302-1 and 302-2 during co-molding, which results in an increased bonding strength in the direction that molding tabs 302 extend from outer panel 202. It is noted that various sizes and locations for cutout portions 302-1 and 302-2 may be used in different embodiments.

Figure 4:
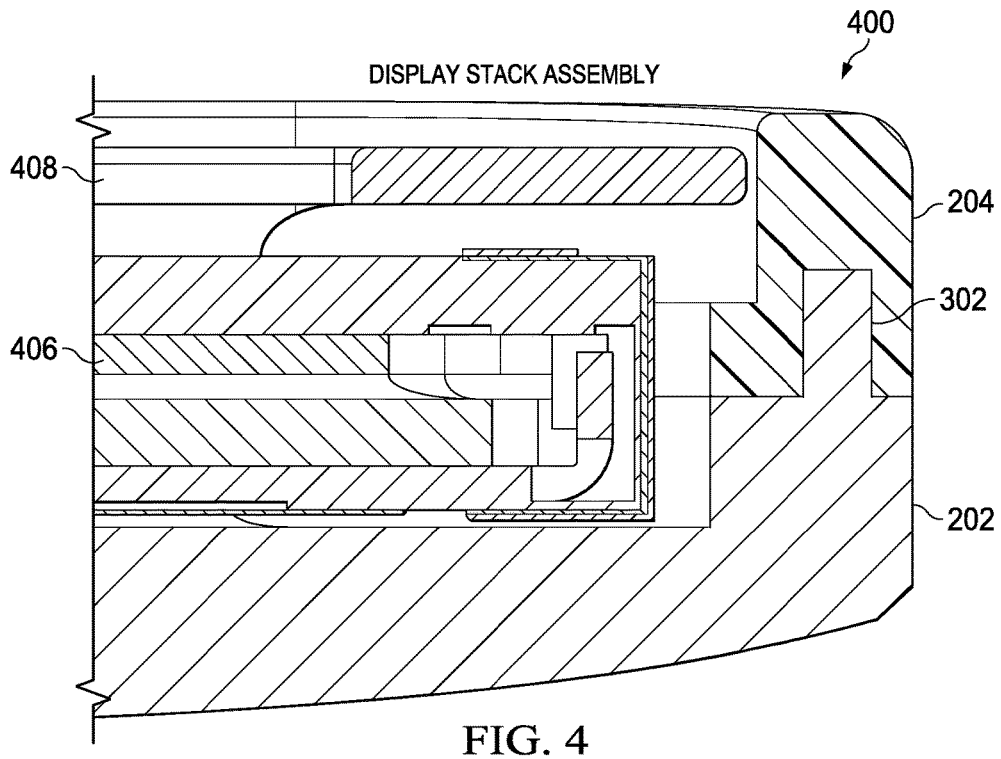
FIG. 4 is an illustration of selected elements of an embodiment of a display stack.

Referring now to FIG. 4, selected elements of an embodiment of a display stack assembly 400 are illustrated. Display stack assembly 400 shows a sectional view at an edge of display cover panel 200 after assembly into the final display. FIG. 4 is a schematic illustration and is not drawn to scale. As shown, display stack assembly 400 illustrates various layered elements included in a thin display device having touch functionality, such as in a portable information handling system. One embodiment of the construction of display stack assembly 400 is shown in a cut-away view at an edge portion in FIG. 4, which enables a display having a very small or no border to be implemented. It is noted that different constructions of display stack assembly 400 may be used with insert molding 204, as disclosed herein.

In display stack assembly 400, touch panel portion 408 may include a cover glass that is an external cover layer that is optically transparent. The cover glass may be bonded to, or may be in contact with, a touch panel layer included in touch panel portion 408, which may represent an array of sensors that are sensitive to touch inputs on the cover glass received from a user. For example, the touch panel layer may be a capacitive touch sensor and may be correspondingly connected to electronics for driving and sensing touch operation, which are omitted for descriptive clarity.

As shown in FIG. 4, liquid crystal module 406 may include a liquid crystal display (LCD) cell, various filter films, a light guide, and a reflector. In various embodiments, display stack assembly 400 is enclosed by outer panel 202 and may include an LCD cell that is an open cell that allows light to be transmitted from the light guide towards the cover glass 202 to produce a display image. A light source, such as a string (or an array) of LEDs, provides illumination to the light guide for backlighting the open cell.

Also visible in FIG. 4 is the co-molded joint between outer panel 202 and insert molding 204. In particular, molding tab 302 is surrounded at three faces by insert molding 204 to provide a greater surface area to improve bonding strength. As shown, insert molding 204 is flush at an external surface of display stack assembly 400 with outer panel 202 for a smooth and sleek appearance, which is desirable. It is noted that outer panel 202 and insert molding 204 may be formed in different colors and with different surface textures. Because insert molding 204 is bonded to outer panel 202 which a high strength co-molded bond, insert molding 204 serves to protect touch panel portion 408 and liquid crystal module 406 according to the high standards for a durable portable information handling system, while having very small dimensions that enable display stack assembly 400 to be formed with little or no border.

Figure 5:
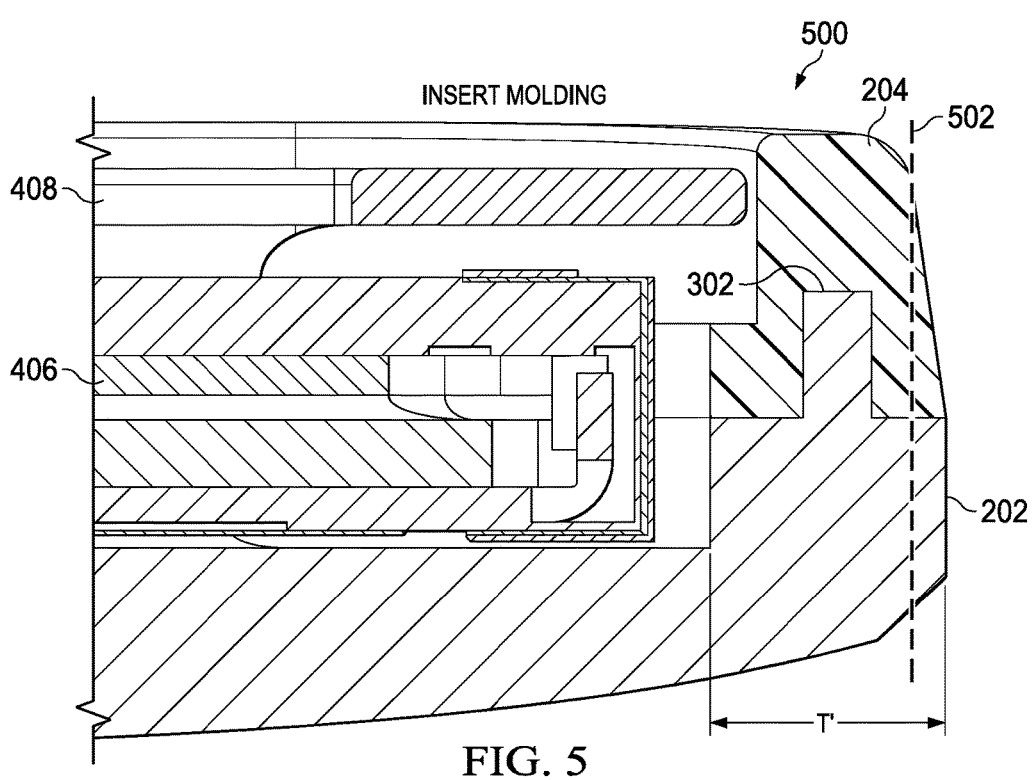
FIG. 5 is an illustration of selected elements of an embodiment of an insert molding.

Referring now to FIG. 5, selected elements of an embodiment of an insert molding view 500 are illustrated. FIG. 5 is a schematic illustration and is not drawn to scale. Insert molding view 500 shows a cross section of insert molding 204 bonded to outer panel 202. In insert molding view 500, outer panel 202 and insert molding 204 are formed with additional material than in the final version shown in FIG. 6, for example. Specifically, a maximum thickness of the insert molding 204 may be T' after co-molding, which is greater than a maximum thickness T of insert molding 204 in a final implementation (see FIG. 6). Line 502 shows a final external surface at an external edge of a portable information handling system. In this manner, outer panel 202 may be formed with additional material at the external edge, and insert molding 204 may be co-molded with additional material at the external edge. Then, in a finishing operation, such as machining by diamond cutting, the extra material may be removed to line 502 to form a sleek and seamless transition between outer panel 202 and insert molding 204.

Figure 6:
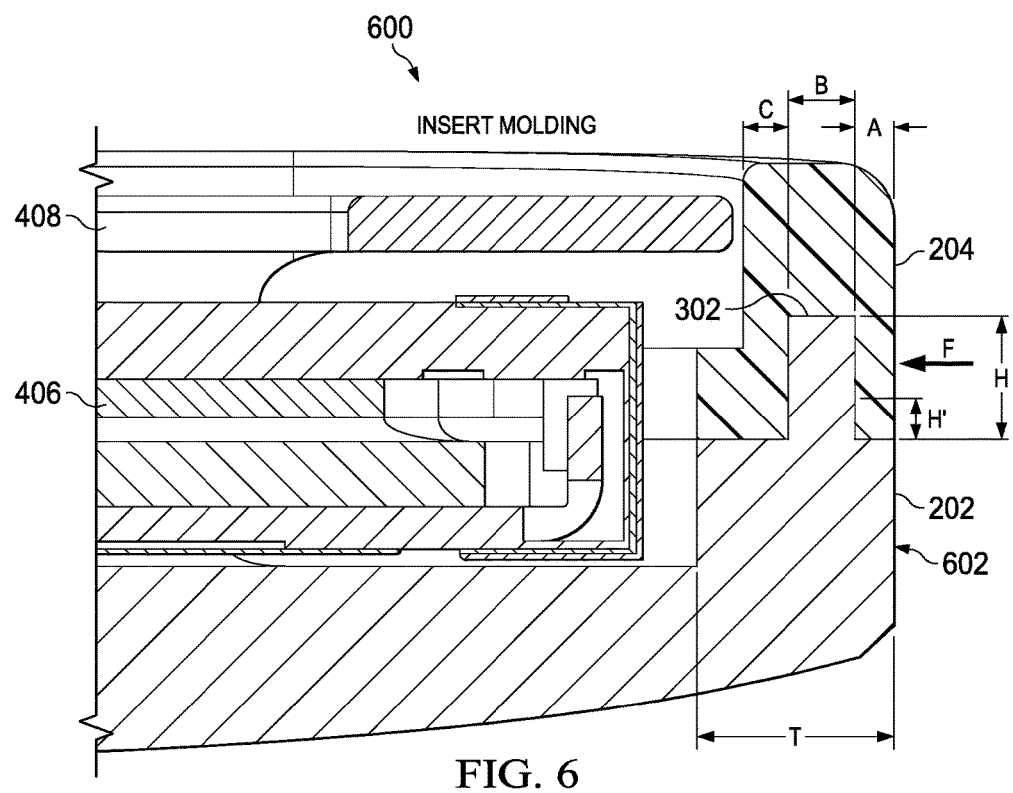
FIG. 6 is an illustration of selected elements of an embodiment of an insert molding.

Referring now to FIG. 6, selected elements of an embodiment of an insert molding view 600 are illustrated. FIG. 6 is a schematic illustration and is not drawn to scale. Insert molding view 600 shows a cross section of insert molding 204 bonded to outer panel 202. In insert molding view 500, outer panel 202 and insert molding 204 have been subject to final trimming to form external surface 602, which corresponds to line 502 in FIG. 5.

Also shown in FIG. 6 are certain dimensions of outer panel 202 and insert molding 204. Specifically, outer panel 202 and insert molding 204 have a maximum thickness T. Molding tab 302 has a height H and a width B. Insert molding 204 has a first portion covering molding tab 302 at an external edge having a thickness A. Insert molding 204 has a second portion covering molding tab 302 at an internal edge of outer panel 202 having a thickness C. Accordingly, insert molding 204 has a minimum thickness given by (A+B+C) when bonded to molding tab 302. Also shown in FIG. 6 is force vector F that is normal to external surface 602. Force vector F represents a force that insert molding 204 can withstand and indicates a bonding strength between insert molding 204 and outer panel 202.

In various embodiments, T may be less than about 2.00 mm, or about 1.75 mm. In various embodiments, H may be less than about 1.50 mm, or about 1.10 mm. In various embodiments, B may be less than about 0.75 mm, or about 0.60 mm. In various embodiments, A may be less than about 0.5 mm, or about 0.35 mm. In various embodiments, C may be less than about 0.5 mm, or about 0.4 mm. In various embodiments, force F may be greater than 40 Newtons (N), or about 50N. Accordingly, a first dimensionless ration of H to B may be at least 1.8, while a second dimensionless ratio of H to (A+B+C) may be at least 0.8. It is noted that reduced height H' of molding tab 302 may correspond to cutout portions 302-1 and 302-2 (see FIG. 3). For the range of dimensions of insert molding 204 and molding tab 302 disclosed herein, a desired value for force F may not be attained using other bonding methods, such as gluing or stamping, than co-molding due to material weakness or process reliability.

Figure 7A:
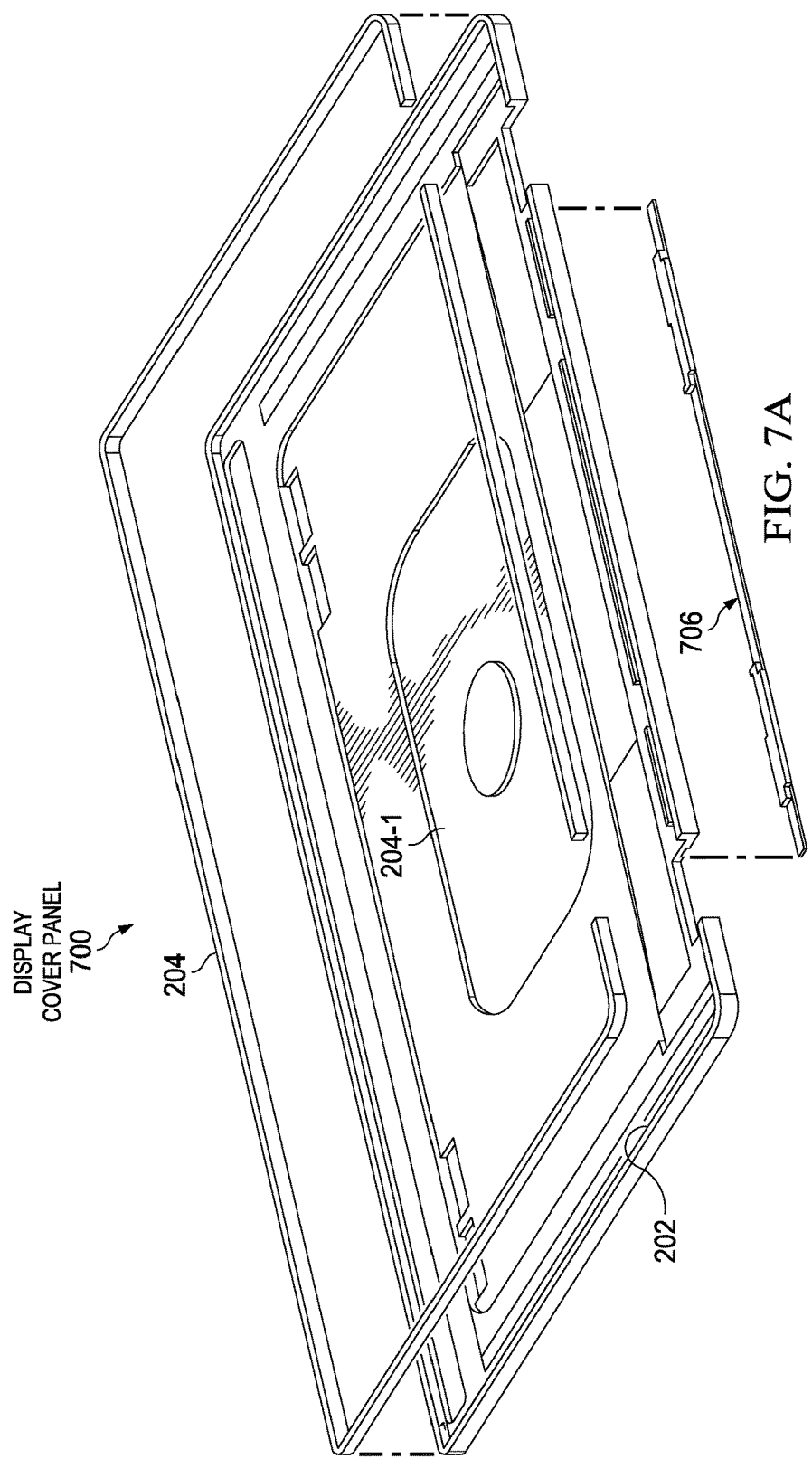
FIGS. 7A, 7B, and 7C are illustrations of selected elements of an embodiment of a display cover panel.

Referring now to FIG. 7A, selected elements of an embodiment of a display panel cover 700 for a portable information handling system, such as information handling system 100 in FIG. 1, are illustrated. FIG. 7A is a schematic illustration and is not drawn to scale. In FIG. 7A, display panel cover 700 is shown comprising outer panel 202 and insert molding 204, which is shown separated for clarity. In particular embodiments, display panel cover 200 may be used with displays having a diagonal size of 12 inches or greater. Insert molding 204 is shown encompassing an external edge of display panel cover 200 along three full edges and also partially, as a hinge insert molding 204-1 along a fourth edge that corresponds to and is proximate to a display hinge of information handling system 100. Hinge insert molding 204-1 is formed in a substantially similar manner to insert molding 204 and is co-molded over a hinge molding tab 302 along the fourth edge that is formed in outer panel 202.

Additionally, in FIG. 7A, exterior insert molding 706 is shown that is a co-molded element included in an exterior surface of information handling system 100. Specifically, exterior insert molding 706 may cover an edge portion of the display panel cover at an opposing exterior surface to the display hinge. Exterior insert molding 706 may be formed with a subsequent co-molding operation to insert molding 204 (including hinge insert molding 204-1). In various embodiments, any suitable plastic material may be used to form exterior insert molding 706.

Figure 7C:
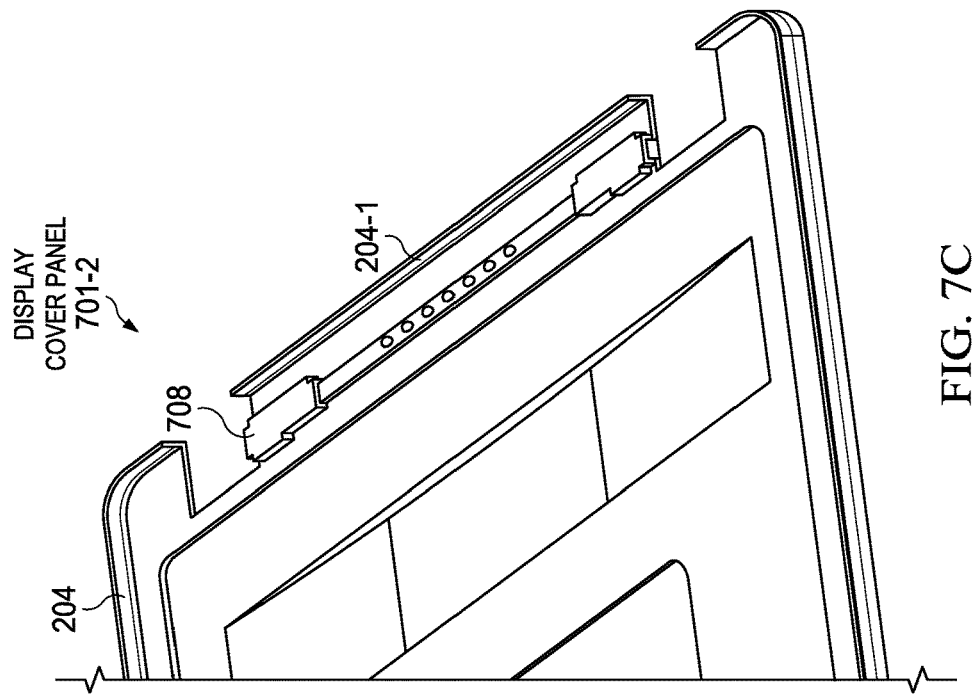
Figure 7B:
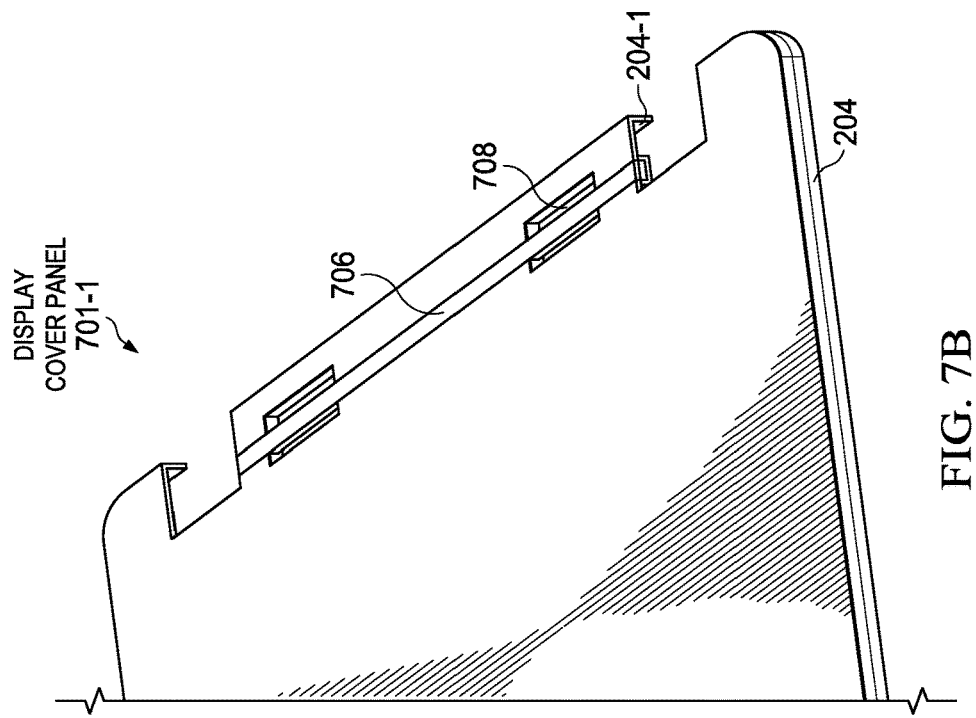

Referring now to FIGS. 7B and 7C, selected elements of an embodiment of a display panel cover 701 for a portable information handling system, such as information handling system 100 in FIG. 1, are illustrated. FIGS. 7B and 7C are schematic illustrations and are not drawn to scale. In FIG. 7B, further details of hinge insert molding 204-1, exterior insert molding 706, and an exterior molding portion 706 are shown. Specifically, exterior molding portion 708 is shown having a form to receive exterior insert molding 706, which forms an exterior surface of the display panel cover. In FIG. 7B, display cover panel 701-1 shows an exterior view where exterior insert molding 706 forms an exterior surface of display panel cover 701 (an information handling system 100). In FIG. 7C, display cover panel 701-2 shows an interior view of an interior portion of exterior insert molding 706, as well as a corresponding layout of exterior molding portion 708.

Figure 8:
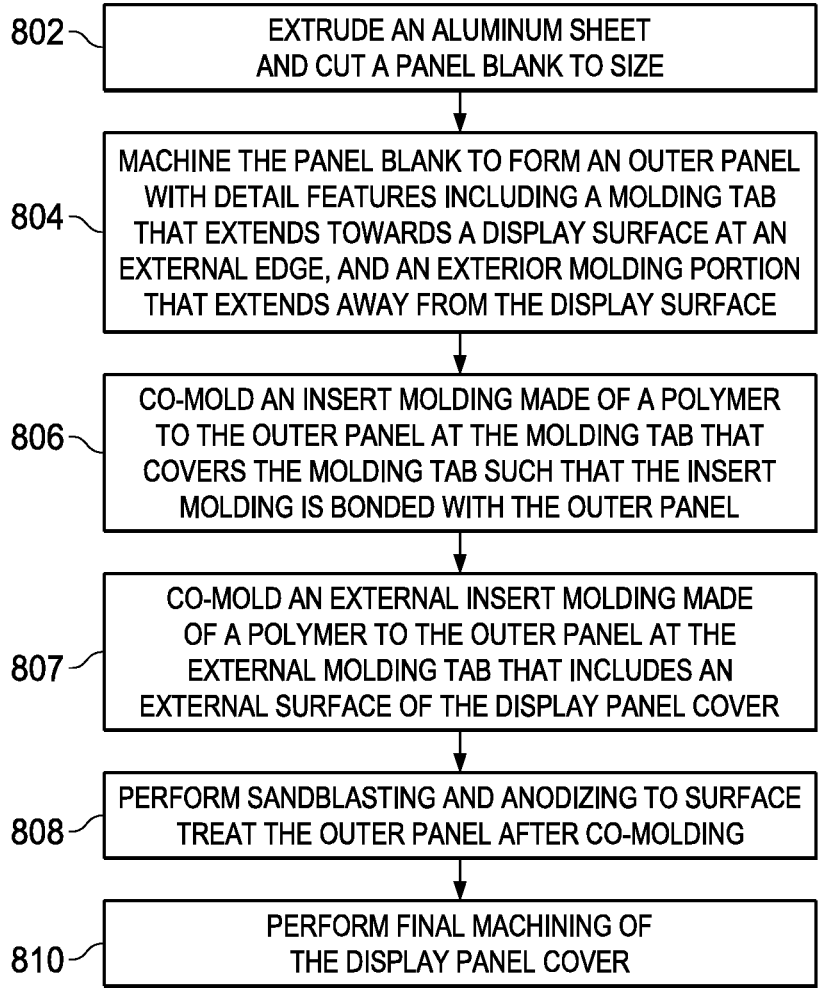
FIG. 8 is a flow chart of selected elements of an embodiment of a method for manufacturing a display panel cover.

Turning now to FIG. 8, a block diagram of selected elements of an embodiment of method 800 for manufacturing a display panel cover, as described herein, is depicted in flow chart form. It is noted that certain operations described in method 800 may be optional or may be rearranged in different embodiments.

Method 800 may begin, at by extruding (operation 802) an aluminum sheet and cutting a panel blank to size. It is noted that other metals than aluminum may be used in different embodiments, such as magnesium. The panel blank may be machined (operation 804) to form detail features including a molding tab that extends towards a display surface at an external edge to form an outer panel. The molding tab may include cutout portions to improve the bonding strength of the insert molding, as described with respect to FIG. 3. It is noted that operations 802 and 804 may be replaced with different metal-forming techniques, such as using a powder metallurgical process to form the outer panel. An insert molding made of a polymer may be co-molded (operation 806) to the outer panel at the molding tab that covers the molding tab such that the insert molding is bonded with the outer panel. The outer panel may be placed in a co-mold to injection mold the insert molding in operation 806. After operation 806, extra material may be present at an external surface, as described with respect to line 502 in FIG. 5. Sandblasting and anodizing may be performed (operation 808) to surface treat the outer panel after co-molding. A final machining of the display panel cover may be performed (operation 810). Operation 810 may include diamond cutting to create a final desired smooth surface at line 502.

As disclosed herein, a display in a portable information handling system may have a narrow or no border. A display panel cover included with the display may be formed with an insert molding that is co-molded with an outer panel for high bonding strength and high stiffness, as well as providing a desired high quality external appearance to information handling system. Additionally, an exterior insert molding may be formed to include an exterior surface of the information handling system.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for forming a display cover panel for portable information handling systems, comprising:
    forming an outer panel that is an exterior of a display included in a portable information handling system, wherein the outer panel includes a molding tab that extends in a first direction towards a display surface of the display, wherein the molding tab is located next to an external edge of the outer panel, and wherein the molding tab has a height H and a width B;
    co-molding an insert molding to the outer panel at the molding tab, wherein the molding tab is covered by the insert molding over the height H and the width B, wherein the insert molding includes a polymer that is bonded with the outer panel during the co-molding; and
    wherein:
        the display has a minimum diagonal size of 12 inches;
        a maximum thickness T of the insert molding when bonded to the molding tab is less than 2 mm and a first dimensionless ratio of H to B is at least 1.8;
        a first bonding strength of the insert molding bonded with the outer panel at the molding tab is sufficient to withstand at least 45 Newtons force applied in a second direction perpendicular to the first direction at the external edge;
        the insert molding has a first portion covering the molding tab at the external edge having a thickness A;
        the insert molding has a second portion covering the molding tab at an internal edge of the outer panel having a thickness C;
        the insert molding has a minimum thickness given by (A+B+C); and
        a second dimensionless ratio of H to (A+B+C) is at least 0.8.

2. The method of claim 1, wherein the co-molding further comprises co-molding the insert molding with a thickness T' that is greater than T, and wherein the method further comprises:
    diamond cutting the outer panel and the insert molding to reduce the maximum thickness of the insert molding to T, wherein the diamond cutting forms an exterior surface of the portable information handling system, wherein the outer panel is formed of aluminum and the insert molding comprises a carbon-fiber-filled poly(butylene terephthalate) resin, and wherein the insert molding is formed at more than one external edge of the outer panel.

3. The method of claim 2, wherein:
    a third dimensionless ratio of H to T is at least 0.6;
    the insert molding increases a stiffness of the display cover panel;
    the height H is less than 1.5 mm and the thickness B is less than 0.75 mm; and
    the insert molding includes the exterior surface.

4. The method of claim 3, wherein:
    the molding tab includes a hinge molding tab that is formed in the first direction along the external edge that is proximate to a display hinge of the portable information handling system; and
    the insert molding includes a hinge insert molding bonded with the outer panel at the hinge molding tab.

5. The method of claim 3, wherein the outer panel includes an exterior molding portion extending in a third direction opposite the first direction and opposing the hinge molding tab, and wherein the display cover panel further comprises:
    an exterior insert molding bonded with the outer panel at the exterior molding portion, wherein the exterior insert molding includes the exterior surface.

6. The method of claim 1, wherein the molding tab includes at least one cutout portion having a reduced height H' that is less than H, wherein a cutout portion forms a tab in the insert molding corresponding to the cutout portion during co-molding, and wherein the cutout portion includes an overhang that increases a second bonding strength of the insert molding to the outer panel in the first direction.

* * * * *